(No Model.)
J. WOOD.
APPARATUS FOR GRINDING AND SEPARATING ORE, &c.
No. 306,987. Patented Oct. 21, 1884.
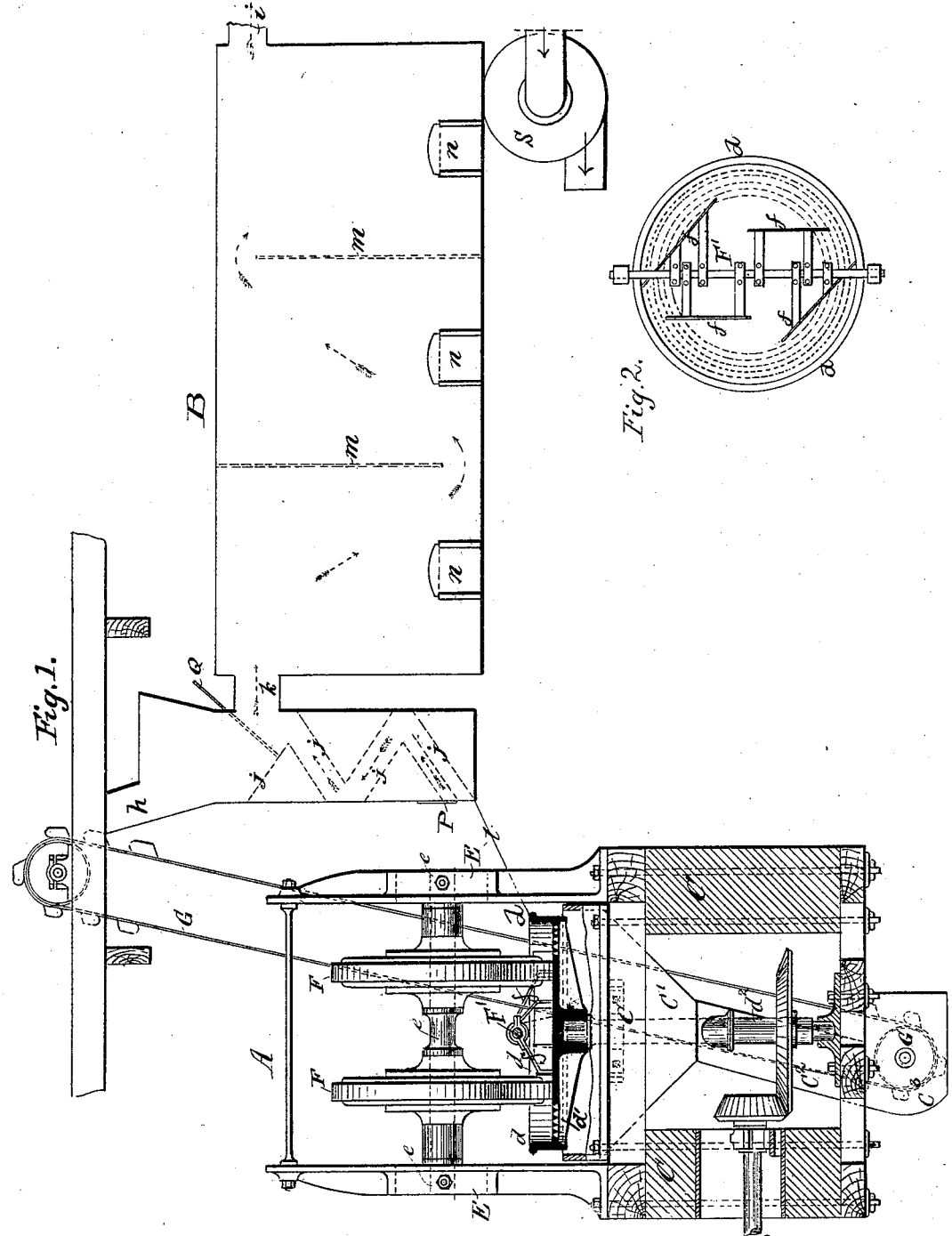

United States Patent Office.

JAMES WOOD, OF WEST STOCKWITH, COUNTY OF NOTTINGHAM, ENGLAND.

APPARATUS FOR GRINDING AND SEPARATING ORE, &c.

SPECIFICATION forming part of Letters Patent No. 306,987, dated October 21, 1884.

Application filed October 2, 1883. (No model.) Patented in England August 17, 1883, No. 4,002; in France September 14, 1883, No. 157,552, and in Belgium September 15, 1883, No. 62,589.

*To all whom it may concern:*

Be it known that I, JAMES WOOD, a subject of the Queen of Great Britain and Ireland, and residing at West Stockwith, in the county of Nottingham, England, have invented certain Improvements in Apparatus for Grinding and Separating Ore and other Substances, (for which I have obtained a British patent, No. 4,002, August 17, 1883; Belgian patent, No. 62,589, September 15, 1883, and French patent, No. 157,552, September 14, 1883,) of which the following is a specification.

My invention consists of an apparatus for grinding and separating ores and other substances for the production, by one continuous operation, of powder in the required degree of fineness, as hereinafter fully described and claimed.

In the accompanying drawings, Figure 1 is an elevation, partly in section, of the apparatus; and Fig. 2 is a plan view of the rotary grinding-pan and its stirrers.

The grinding, reducing, or pulverizing portion of the apparatus is represented at A, while the pneumatic separating apparatus is shown at B.

Upon a foundation, C, are mounted two standards, E, between which the horizontal axle $e$ of the vertical grinding runners or rollers F is fixed. These rollers are free to turn independently on the axle $e$ upon the bottom of the pan $d$, which has a rotary motion imparted to it by the shaft $d^2$ from any convenient source of power. The bottom of the pan is provided with an annular series of tapering openings, $d'$, the wider ends of the holes being at the bottom, so as to allow of the free escape of the ground particles and prevent clogging.

Scrapers $f f$, pivoted to a transverse shaft, F', mounted in fixed bearings, rest on the bottom of the pan and direct the material into position to be ground.

The width of each roller is reduced at its grinding-face, while the body of the wheel may be of the normal thickness, except at the periphery, as shown in Fig. 1.

The material, as it is ground by the rollers F, passes through the tapered perforations $d'$ in the bottom of the pan $d$, and falls into a hopper, C', provided with a trunk or chute, C², for conducting the material into the receptacle C³ beneath. From this it is carried off by an endless conveyer, G, and discharged into the chute $h$, leading to the separating apparatus, consisting of a box, B, in which a partial vacuum and an induced air-current are created and maintained in the direction of the arrows by means of an exhaust-fan, S, in communication with the outlet at $i$. The material entering at $h$ falls upon an inclined shelf or series of inclined shelves, $j j$, meeting the current of air passing over the same, whereby the finer portions of the material are carried up and into the body part of the box by the passage $k$, while the heavier portions pass down the chute $l$ back into the grinding-pan $d$, to be further pulverized.

Owing to the use of exhaust-currents instead of the usual blowing apparatus, a partial vacuum is created in the box B, which facilitates the settlement of the powder.

The box may or may not be divided into compartments by partition $m$, with openings alternately above and below. The strength of the current, and consequently the fineness of the powder carried over and passing through the opening $k$, can be regulated by means of a slide, P, while the quantity of material fed to the shelves $j$ can be regulated by a slide, Q. The powder may be removed from the box through doors $n$. By carrying the material away from the pulverizing apparatus by the endless conveyer, the exhaust does not act on the material until it has left the pulverizer.

I am aware that the production and separation of fine powder by a continuous process is not new; but heretofore in such apparatus, where a blower has been used, the air has been forced through the pulverizer, while in my machine the material is ground and has left the pulverizer before it is brought under the action of the air-currents, and then only in the form of an exhaust-draft.

There may be one or two or more rollers or runners F used, as may be convenient, and they may be fixed to the axle, which, in that case, will be free to turn in its fixed bearings in the standards.

I claim as my invention—

1. The herein-described apparatus for producing separated ground materials, said apparatus consisting of a revolving pan having a perforated bottom, a hopper, vertical grinding-wheels, and a separating-box having air inlet and outlet, an exhausting apparatus therefor, and a conveyer for carrying the ground materials to the box, substantially as described.

2. The herein-described apparatus for producing separated ground materials, said apparatus consisting of a pulverizing-machine, a separating-box having an air-exhaust, and an endless conveyer, G, for carrying the ground material to the box, as set forth.

In testimony whereof I have signed my name to this specification in the presence of two subscribing witnesses.

JAMES WOOD.

Witnesses:
ALFRED PARKIN,
    *Doncaster, Notary Public.*
THOS. TAYLOR,
    *Epworth, Solicitor.*